United States Patent Office 3,033,882
Patented May 8, 1962

3,033,882
OCTANOIC ESTERS AND PROCESSES FOR THEIR PREPARATION AND UTILIZATION
Maurice Joullie, Saint-Germain-en-Laye, Michel Laurre, Chatillon-sous-Bagneux, Gabriel Maillard, Puteaux, and Pierre Muller, Paris, France, assignors to Recherches et Propagande Scientifiques, Paris, France, a company of France
No Drawing. Filed Apr. 13, 1959, Ser. No. 805,680
Claims priority, application France Apr. 17, 1958
9 Claims. (Cl. 260—398)

This invention provides new octanoic esters and process for their preparation and utilization.

The dextrorotatory form of 5-(1′,2′-dithiolane-3-yl)-pentanoic acid having the conventional formula:

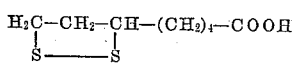

and known as α-lipoic acid or as thioctic acid is a substance of considerable importance, having vitaminic activity and functioning as a growth factor for certain micro-organisms. In consequence, much research and experimentation has been devoted to the development of processes for the synthesis of the product.

Usually, the synthesis of α-lipoic acid has heretofore involved the employment as intermediate of an alkyl 6-keto-7-octenoate of the formula
$$CH_2=CH-CO-(CH_2)_4-COOR,$$
where A represents a lower alkyl group (generally an ethyl group), prepared, according to the method of Bullock et al., J. Am. Chem. Soc. 74, 3455 (1952) and 76, 1828 (1954), by the interaction of monoethyl adipyl chloride and ethylene in the presence of aluminium chloride:

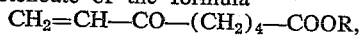

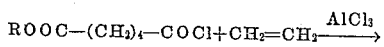

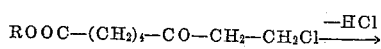

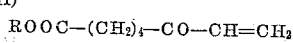

There is an intermediate formation of an 8-chloro-6-keto-octanoate (II) which, when treated in situ with an alkali metal acetate, gives the alkyl 6-keto-7-octenoate (I).

Starting from the compound of Formula I, the requisite sulphur atoms have been introduced in two stages. The first stage has been effected either by the addition of thioacetic acid (which is a relatively expensive reagent):

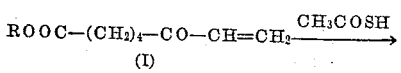

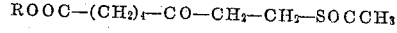

or by the addition of a mercaptan R′—SH. In the latter case, it is necessary (as will later be explained) to effect a subsequent hydrogenolysis by means of sodium in liquid in liquid ammonia:

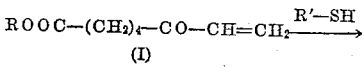

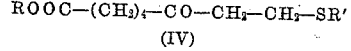

The ketone function is thereafter reduced by means of sodium borohydride (which is a very expensive reagent):

(a)

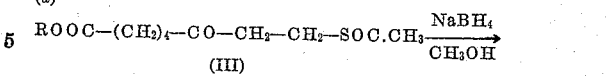

or
(b)

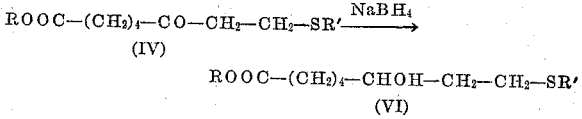

The introduction of the second sulphur atom into the products of Formula V or VI respectively is effected by means of thiourea in the presence of a hydrohalic acid, and there is formed in both cases an isothiouronium salt:

(a)

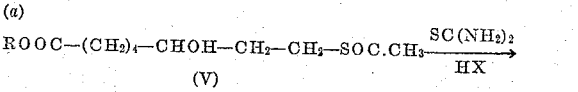

or
(b)

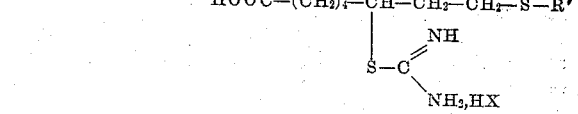

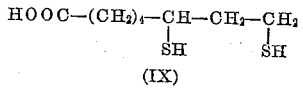

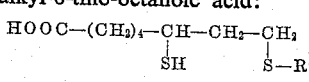

the symbol X designating a halogen atom.

By treatment of the product in an alkaline medium, there is obtained either 6,8-dithio-octanoic acid:

$$HOOC-(CH_2)_4-CH-CH_2-CH_2$$
$$\phantom{HOOC-(CH_2)_4-C}| \phantom{H_2-C}|$$
$$\phantom{HOOC-(CH_2)_4-C}SH \phantom{H_2-C}SH$$
(IX)

or an 8-thioalkyl-6-thio-octanoic acid:

$$HOOC-(CH_2)_4-CH-CH_2-CH_2$$
$$\phantom{HOOC-(CH_2)_4-C}| \phantom{H_2-C}|$$
$$\phantom{HOOC-(CH_2)_4-C}SH \phantom{H_2-C}S-R'$$
(X)

which latter, on hydrogenolysis by means of sodium in liquid ammonia, also yields the acid (IX).

Finally, 6,8-dithio-octanoic acid can be oxidized, with concomitant cyclisation, by means of a current of oxygen or air in an alkaline medium in the presence of ferric chloride to yield the required α-lipoic acid.

It is an object of the present invention to provide new intermediates for the production of octanoic acids convertible into α-lipoic acid. Is is a further object of this invention to provide a new and improved synthesis of said octanoic acids which involves the use of the aforesaid new intermediates and in which more readily available and cheaper reagents can be employed as compared to already known processes.

The new compounds of the present invention are the octanoic esters of the general formula:

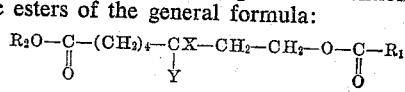

wherein $R_1$ represents the residue of a carboxylic acid, $R_2$ represents an alkyl group and X and Y either represent respectively a hydrogen atom and an hydroxyl group or collectively represent an oxygen atom. The radical $R_1$ is preferably derived from a lower aliphatic carboxylic acid, such as formic acid or acetic acid; other examples, however, are lower araliphatic carboxylic acids, such as phenylacetic acid, or simple aromatic carboxylic acids, such as benzoic. The radical $R_2$ is preferably a lower alkyl group, more especially an alkyl group containing from one to three carbon atoms. Preferred compounds are those in which $R_1$ represents a hydrogen atom or a methyl or phenyl group and $R_2$ represents a methyl, ethyl or isopropyl group.

According to a feature of the invention, compounds of the foregoing general formula in which X and Y collectively represent an oxygen atom (viz. alkyl 8-acyloxy-6-keto-octanoates) are prepared by reacting a carboxylic acid with an alkyl 6-keto-7-octenoate in the liquid phase. In carrying out this reaction, it is preferred to operate at or in the neighbourhood of the boiling point of the reaction mixture, at normal atmospheric pressure, in the absence of a catalyst, using an excess of anhydrous carboxylic acid, when yields in excess of 50% based on the weight of ketone employed are obtainable. Reaction time, operating pressure and temperature have a marked effect upon yield but optimum conditions for given reactants can readily be determined by simple preliminary trial and from the examples given hereinafter. In the case of the use of acetic acid (a preferred reactant) it has been found that under 130 kg./cm.$^2$ of nitrogen and at a temperature of 220° C. there is no significant acetylation but complete polymerisation of the ethylenic ketone starting material. When operating at 120° C. under 150 kg./cm.$^2$ of nitrogen, a slight polymerisation of the ethylenic ketone has been observed with formation of a small quantity of alkyl acetoxyketooctanoate (7%).

It is convenient to carry out the reaction in the absence of light and of oxygen, for example under a current of non-oxidizing gas, such as nitrogen, because ketoethylene esters have a strong tendency to polymerise under the action of actinic light. The time for which the reaction medium is maintained at boiling point need not exceed 6 hours, and it is preferable for it to be more than 2 hours in order that too much unconverted starting material may not remain.

According to a further feature of the invention, compounds of the foregoing general formula, in which X and Y represent respectively a hydrogen atom and an hydroxyl group (viz. alkyl 8-acyloxy-6-hydroxy-octanoates), are prepared by the reduction of the corresponding 6-keto compounds as obtained by the process described in the last preceding paragraph. This reduction may be effected by the usual methods for the reduction of ketones, e.g. with molecular hydrogen in the presence of a suitable catalyst, such as platinum, Sabatier nickel or Raney nickel. Thus, it is possible very simply to operate without any particular precautions in the presence of Raney nickel, for example under 100 atmospheres of hydrogen and at 60–70° C. or under a pressure above 110 atmospheres and at a temperature lower than 50° C. Yields of alkyl 8-acetoxy-6-hydroxy-octanoates of the order of 80% have been obtained in this way. It is also possible to operate in the presence of Raney nickel at normal pressure provided that an alkali or an organic base is added to make the medium slightly alkaline, in accordance with the method of Delepine and Horeau, Bull. Soc. Chim., 6, 1937, 4, 31.

It is furthermore possible to carry out the reduction by means of aluminium isopropoxide or by means of an alkali metal borohydride in anhydrous alcoholic medium, more especially in isopropanolic medium in the first case and in a methanolic medium in the second case. In the first case, a transesterification takes place when, for example, methyl ester or ethyl ester is employed as starting material.

As already indicated, the new compounds of the present invention, namely the alkyl 8-acyloxy-6-keto-octanoates and the alkyl 8-acyloxy-6-hydroxy-octanoates are useful intermediates for the preparation of octanoic acids themselves convertible in known manner into α-lipoic acid. More specifically, the 6-keto compounds have the advantage that they serve as a very convenient source of the corresponding 6-hydroxy compounds which are themselves readily convertible into useful octanoic acids.

According to a feature of the invention, an alkyl 8-acyloxy-6-hydroxy-octanoate is reacted with thiourea in a hydrohalic acid medium and the reaction product or the medium in which it is formed is treated with alkali to form dithio-octanoic acid. The reaction scheme may be represented as follows:

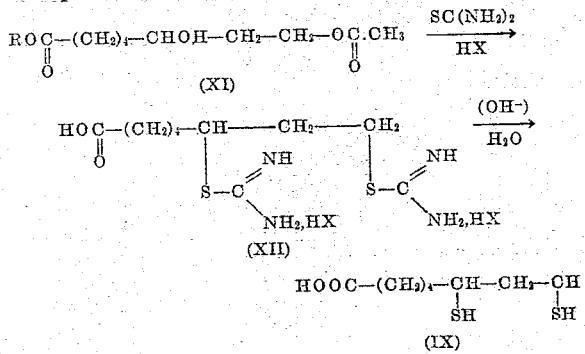

The dithiol (IX) may be subsequently oxidized for the purpose of obtaining thioctic acid, by means of a current of oxygen or of air in an alkaline medium in the presence of ferric chloride, by one of the known methods.

According to yet a further feature of the invention, an alkyl 8-acyloxy-6-hydroxy-octanoate (XI) is hydrolysed in alkaline medium or in acid medium to give 6,8-dihydroxy-octanoic acid, which latter can be transformed into thio-octanoic acid (IX) by means of thiourea, as has been stated in the foregoing. 6,8-dihydroxy-octanoic acid can also be converted, by means of the halogenating agents generally employed, into a 6,8-dihalogeno-octanoic acid which yields dithio-octanoic acid (IX) on treatment with an alkali hydrosulphide in alcoholic solution or which, by the action of an alkali disulphide, is directly convertible to α-lipoic acid.

The following examples, in which the Geneva system of numbering is used, illustrate the invention.

EXAMPLE I

*Methyl 8-Acetoxy-6-Keto-Octanoate*

Into a 500 cc. spherical flask provided with a condenser closed with a calcium chloride guard-tube are introduced methyl 6-keto-7-octenoate (25.5 g., 0.15 molecule), anhydrous acetic acid (112.5 g., 12.5 times the theoretical quantity), which has been rectified in the presence of a little acetic anhydride, and hydroquinone (0.2 g., anti-oxidant).

The mixture is refluxed for 6½ hours. The acetic acid is driven off under 20 mm. Hg, and the residue is then distilled under 0.35 mm. Hg.

18 g., i.e. 52% of the theoretical quantity, of pure product are obtained, B.P.$_{0.35\ mm.}$= 124–125° C. The product has the following analysis: Calculated for $C_{11}H_{18}O_5$ C=57.39%, found C=57.57%; calculated H=7.82%, found H=7.70%. Its molecular weight, determined by cryoscopy in benzene, is 225 (the theoretical is 230). The other physical properties measured are: B.P.$_{0.35\ mm.}$=124–125° C.; B.P.$_{0.15\ mm.}$=116–118° C.; $d^{23°}$=1.090; $n_D^{22.8°}$=1.4460. The U.V. spectrum has $\lambda_{max.}$=2790 A., $d_0$=0.43, and $\lambda_{min.}$=2500 A., $d_0$=0.20.

The following tests (a) to (l) show the influence of the main factors governing the reaction:

(a) Into an autoclave are introduced methyl 6-keto-7-octenoate (25.5 g.), anhydrous acetic acid (112.5 g.)

(rectified in the presence of acetic anhydride), and hydroquinone (2.2 g., anti-oxidant).

The autoclave is charged with nitrogen to a pressure of 100 kg./cm.$^2$ and the temperature is maintained for 5 hours at 120° C. The pressure is thus raised to 150 kg./cm.$^2$.

After cooling and decompression, the brown acetic acid solution is distilled under 12 mm. Hg in order to eliminate the excess of acetic acid, and the residue is distilled under 0.4–0.5 mm. Hg, giving the following fractions: first fraction, M.P.$_{0.5\text{ mm.}}$=87–107° C., 10 g.; second fraction, B.P.$_{0.4\text{ mm.}}$=107–132° C., 13 g.; and a polymerised residue, 2.5 g.

The first fraction corresponds mainly to unreacted ethylenic ketone.

The second fraction (B.P. 107–132° C. under 0.4 mm. Hg) is redistilled. There is thus obtained a product (2.5 g.), B.P.$_{0.25\text{ mm.}}$=122–124° C., and a polymerized residue (3.5 g.). The yield is 7.2%.

The product has the following analysis: calculated for $C_{11}H_{18}O_5$ C=57.39%, found C=57.95%; calculated H=7.82%, found H=7.56%.

(b) A test made under the same operating conditions but at 220° C. and under 130 kg./cm.$^2$ of nitrogen for 5 hours gives a solid polymerised product.

(c) Into a similarly equipped spherical flask are introduced the ketoethylenic ester (25.5 g.), acetic acid (112.5 g.), with water (5.6 cc.) in order to ascertain whether it is necessary to use anhydrous acetic acid.

The mixture is refluxed for 5 hours. After distillation there are obtained 15 g. (43%) of product, B.P.$_{0.15\text{ mm.}}$=116–118° C.

The product has the following analysis: Calculated C=57.39%, found C=58.40–58.26%; calculated H=7.82%, found H=7.86–7.73%. Other properties were $d^{23°}$=1.088; $n_D^{22.8°}$=1.4476; and U.V. spectrum: $\lambda_{max.}$=2790 A., $d_0$=0.424 and $\lambda_{min.}$=2500 A., $d_0$=0.226, O=1/250 in methanol.

(d) Methyl 6-keto-7-octenoate (53 g., 0.33 molecule), crystallisable acetic acid (250 g., 4.16 molecules, i.e. 12.5 times the theoretical quantity), mercuric acetate (5 g.), and hydroquinone (0.5 g.), are heated in a closed vessel on an oil bath at 125–130° C. for 5 hours.

After cooling, the mixture, which has become pale yellow, is distilled under a pressure of 15–20 mm. Hg in order to eliminate the excess of acetic acid. For this purpose, there is employed a 30 cm. Vigreux column. That part which does not distil at 100° C. under 3 mm. Hg is then fractionated under 0.2–0.3 mm. Hg with a 12 cm. Vigreux column, and there is obtained a first fraction (16 g.), B.P.$_{0.3\text{ mm.}}$=80–102° C., and a second fraction (45 g.), B.P.$_{0.2\text{ mm.}}$=102–130° C.

The second fraction (B.P.$_{0.2\text{ mm.}}$=102–130° C.) is fractionated a second time with a 20 cm. column, and there are obtained a first fraction (5.5 g.), B.P.$_{0.15\text{ mm.}}$=90–122° C., and a second fraction, B.P.$_{0.13\text{ mm.}}$=116–118° C.

The second fraction (B.P.$_{0.13\text{ mm.}}$=116–118° C., yield 50%) corresponds to the desired product. It has $n_D^{21.8°}$=1.4471, and analysis gives: Calculated C=57.39%, found C=57.30%; calculated H=7.82%, found H=7.80–7.83–.

(e) Methyl 6-keto-7-octenoate (20 g.), crystallisable acetic acid (80 cc.), hydroquinone (0.5 g.), and anhydrous cadmium acetate (2 g.) are heated in a closed vessel at 120–130° C. for 4 hours. After cooling, the acetic acid is driven off by distillation under reduced pressure, and the residue is fractionated under a higher vacuum. The product obtained (yield 48%) has the following properties: B.P.$_{0.25\text{ mm.}}$=116–118° C.; $d^{23°}$=1.090; $n_D^{21.6°}$=1.4465; and U.V. spectrum: $\lambda_{max.}$=2770 A., $d_0$=0.407; $\lambda_{min.}$=2460 A., $d_0$=0.158, C=1/250 in methanol.

The product has the following analysis: Calculated for $C_{11}H_{18}O_5$ C=56.39%, found C=57.61–57.61%; calculated H=7.82%, found H=7.73–7.76%.

(f) Into a spherical flask provided with a condenser and a calcium chloride guard-tube are introduced the ketoethylenic ester (25.5 g.), anhydrous acetic acid (112.5 g.), mercuric chloride (2.5 g.), and hydroquinone (0.2 g.).

The mixture is refluxed for 5 hours. When the acetic acid has been driven off in vacuo (20 mm. Hg), the residue is distilled under 0.4 mm. Hg.

There are obtained 9 g. (yield 26%) of product, B.P.$_{0.4\text{ mm.}}$=120–121° C. The product is contaminated with mercuric chloride. It has the U.V. spectrum: $\lambda_{max.}$=2780 A., $d_0$=0.502; and $\lambda_{min.}$=2530 A., $d_0$=0.275. Its refractive index, $n_D^{21.7°}$=1.4513.

(g) Into a similarly equipped spherical flask are introduced the ketoethylenic ester (51 g., 0.3 molecule), acetic acid (225 g., i.e. 12.5 times the theoretical quantity), water (11.2 cc.), and mercuric acetate (5 g.).

The mixture was refluxed for 5 hours. After having proceeded as before, there are obtained 5 g. of product, i.e. a yield of 7%. Its analysis is as follows: Calculated C=57.39%, found C=58.45–58.26%; calculated H=7.82%, found H=7.70–7.75%. It has the following physical properties: $d^{23°}$=1.077; $n_D^{22°}$=1.4518.

The spectral analysis and the physical constants of this product reveal the presence of impurities.

Its U.V. spectrum is as follows: $\lambda_{max.}$=2850 and 3150 A.; $\lambda_{min.}$=2540 A., C=1/250 in methanol.

(h) An identical test, in which the mercuric acetate is replaced by chloride, gives a yield of 2%.

The yields indicated throughout the example were calculated on the basis of the ketone introduced and not in relation to the amount of ketone consumed.

When working in the absence of light and under a current of nitrogen, it is possible to recover, and subsequently to use, the greater part of the unreacted ketone.

The influence of time upon the reaction is apparent from the following tests:

(i) The foregoing procedure is followed, starting with methyl 6-keto-7-octenoate (166 g.), anhydrous acetic acid (750 g.) and hydroquinone (1.5 g.), the reflux time in darkness being 24 hours.

When the acetic acid has been driven off under reduced pressure, the product is fractionated under 0.3 mm. Hg, and there is obtained a first fraction (54 g.), B.P.$_{0.3\text{ mm.}}$=76–80° C., corresponding to the ketomethylenic ester, a second fraction (10 g.), B.P.$_{0.3\text{ mm.}}$=80–110° C., also corresponding to less pure ethylenic ketone, and a third fraction (100 g.), B.P.$_{0.4\text{ mm.}}$=112–120° C., corresponding to methyl 8-acetoxy-6-keto-actanoate.

The yield is 44.6% calculated on the ketone employed, or 63.6% calculated on the ketone actually consumed.

The distillation tails amount to 25 g.

(j) The foregoing procedure is followed, starting with methyl 6-keto-7-octenoate (265 g.) acetic acid (1170 g.) and hydroquinone (2.7 g).

The reflux is carried out in darkness for 6½ hours. The acetic acid is then eliminated by distillation under reduced pressure and the residue is distilled at 0.2 mm. Hg. There are obtained a first fraction (106 g), B.P.$_{0.2\text{ mm.}}$=76–116° C., corresponding to recovered ketoethylenic ester, and a second fraction (156 g.), B.P.$_{0.2\text{ mm.}}$=116–118° C., corresponding to a methyl-8-acetoxy-6-keto-octenoate. The yield is 43.4% calculated on the ketone employed, or 72% calculated on the consumed ketone. The distillation tails amount to 17 g.

(k) The foregoing procedure is followed, starting with 255 g. methyl 6-keto-7-octenoate (255 g.), anhydrous acetic acid (115 g.) and hydroquinone (2 g.). The reflux is effected for 6 hours in darkness under a current of nitrogen.

The acetic acid is eliminated by distillation under reduced pressure and the residue is fractionated, when there is obtained a first fraction (101 g.), B.P.$_{0.2\text{ mm.}}$=

76–116° C. of recovered ethylenic ketone, and a second fraction (176 g.), B.P.$_{0.2 \text{ mm.}}$=116–118° C., methtyl 8-acetoxy-6-keto-octanoate. The yield is 51% calculated on the ketone employed, or 84.6% calculated on the consumed ketone. The distillation tails amount to 10 g.

(*l*) The foregoing procedure is adopted, starting with methyl 6-keto-7-octenoate (45 g.), anhydrous acetic acid (200 g.) and hydroquinone (0.5 g.). The mixture is refluxed for 2 hours under a current of nitrogen in darkness and, after distillation of the acetic acid, the residue is fractionated, when there is obtained a first fraction (30 g.), B.P.$_{0.3 \text{ mm.}}$=76–116° C., ethylenic ketone, and a second fraction (17 g.), B.P.$_{0.3 \text{ mm.}}$=116–118° C., methyl 8-acetoxy-6-keto-octanoate. The yield is 28% calculated on the ketone employed, or 83.7% calculated on the consumed ketone. The distillation tails amount to 1.5 g.

EXAMPLE II

*Methyl 8-Formyloxy-6-Keto-Octanoate*

The procedure of Example I is followed, starting with 0.3 molecule of methyl-6-keto-7-octenoate and 4 molecules of formic acid, with refluxing for 6 hours in darkness.

The formic acid is driven off by distillation under reduced pressure. In the course of the fractionation there is an evolution of formic acid. A non-distillable residue (19 g.) is obtained. The heterogeneous product (5 g.), B.P.$_{0.12 \text{ mm.}}$=106–108° C., analyses as follows: Calculated C=55.55%, found C=58.49% and 58.33%; calculated H=7.40%, found H=7.24% and 7.32%. This product has $d$=1.106 at 23° C. and $n_D^{22°}$=1.4608.

It appears that this product cannot withstand distillation (because of loss of formic acid); it can, however, be used in the crude state for the reduction.

EXAMPLE III

*Methyl 8-Benzoyloxy-6-Keto-Octanoate*

The procedure of Example I is followed, starting with 0.3 molecule of methyl 6-keto-7-octenoate and 1 molecule of benzoic acid. The mixture is heated for 6 hours in darkness on the oil bath at 125° C.

It is taken up in ether and the benzoic acid is removed with sodium bicarbonate solution. After drying of the ethereal solution, the ether is driven off by distillation and the product is distilled under 0.4 mm. Hg.

There is decomposition with loss of benzoic acid during the distillation, and the product passes over at no definite temperature.

EXAMPLE IV

*Ethyl 8-Acetoxy-6-Keto-Octanoate*

The procedure of Example I is followed, starting with ethyl 6-keto-7-octenoate (40 g.) and crystallisable acetic acid (162.5 g.), and reflux is maintained for 10 hours.

The acetic acid is eliminated in vacuo and the product distilled under 0.35 mm. Hg. 25 g. of product distilling at 135–136° C. are obtained.

This fraction is redistilled under 0.2 mm. Hg, B.P.$_{0.2 \text{ mm.}}$=128°–129° C. There are obtained 22.5 g. (yield 41.5%) of pure product, the analysis of which gives: Calculated C=59.01%, found C=59.20% and 59.32%; calculated H=8.19%, found H=8.27% and 8.16%. This product has $d$=1.062 at 23° C. and $n_D^{24°}$=1.4438. Its U.V. spectrum is $\lambda_{max.}$=2.770 A., $d_{0\ max.}$=0.242 and $\lambda_{min.}$=2.460 A., $d_{0\ min.}$=0.065, C=1/400 in methanol.

EXAMPLE V

*Ethyl 8-Formyloxy-6-Keto-Octanoate*

The starting materials employed consist of ethyl 6-keto-7-octenoate (40 g.) and formic acid (128 g.). The mixture is maintained under reflux for 10 hours.

After elimination of the formic acid in vacuo, the product is rectified under 0.30 mm. Hg, when a fraction (25 g.), B.P.$_{0.3 \text{ mm.}}$=140–145° C., is obtained. This fraction is again distilled under 0.20 mm., when 17 g. (34%) of product, B.P.$_{0.2 \text{ mm.}}$=138–140° C., are obtained.

Some decomposition is observed during the second distillation.

Analysis of this product gives: Calculated C=57.39%, found C=58.40% and 58.20%; calculated H=7.82% and found H=7.80% and 7.83%. It has the following physical properties: $d$=1.085 at 25° C.; $n_D^{22°}$=1.4485; and, in its U.V. spectrum, $\lambda_{max.}$=2690 A., $d_{0\ max.}$=0.342, and $\lambda_{min.}$=240 A., $d_{0\ min.}$=0.113, C=1/4000 in methanol.

EXAMPLE VI

*Ethyl 8-Benzoyloxy-6-Keto-Octanoate*

The starting materials employed consist of ethyl 6-keto-7-octenoate (40 g.) and benzoic acid (79.5 g.). The mixture is maintained under reflux for 10 hours.

The mass is taken up in ether (200 cc.) and washed with a solution of 10% sodium bicarbonate (6×100 cc.). The mixture is dried over sodium sulphate, and the ether is driven off by distillation.

The product obtained does not withstand distillation without decomposition.

EXAMPLE VII

*Isopropyl 8-Acetoxy-6-Keto-Octanoate*

The previous procedure is adopted, starting with isopropyl 6-keto-7-octenoate (25 g.) and anhydrous acetic acid (100 g.), the mixture being maintained under reflux under nitrogen in darkness for 6 hours.

After the acetic acid has been eliminated by distillation, the product is fractionated under 0.12–0.15 mm. when the following fractions are obtained: a first fraction (9 g.), B.P.$_{0.15 \text{ mm.}}$=60–110° C., and a second fraction (10 g.), B.P.$_{0.12 \text{ mm.}}$=110–113° C. The distillation tails amount to 5 g., B.P.$_{0.12 \text{ mm.}}$=113° C.

The 110–113° C. fraction is distilled a second time, B.P.$_{0.12 \text{ mm.}}$=111–112° C., giving the desired product (6 g./18% calculated on the ketone employed). Its analysis gives: Calculated C=60.46%, found C=60.81% and 60.65%; calculated H=8.52%, found H=8.50% and 8.55%. It has $d^{25°}$=1.041, and $n_D^{12.4°}$=1.4459.

EXAMPLE VIII

*Isopropyl 8-Formyloxy-6-Keto-Octanoate*

A mixture of isopropyl 6-keto-7-octenoate (20 g.) and formic acid (60 g.) is maintained under reflux for 6 hours under a current of nitrogen in darkness.

The formic acid is eliminated by distillation under reduced pressure and the product is fractionated under 0.25 mm. Hg, when there is obtained a first fraction (2 g.), B.P.$_{0.25 \text{ mm.}}$=60–115° C., and a second fraction (8 g.), B.P.$_{0.25 \text{ mm.}}$=115–125° C.

A second fractionation of the latter under 0.25 mm. Hg gives 4 g. of product (16% calculated on the ketone employed), B.P.$_{0.25 \text{ mm.}}$=117–120° C. The distillation tails amount to 7 g.

The fraction distilling at 117–120° C. under 0.25 mm. Hg analyses as follows: Calculated C=59.18%, found C=59.40% and 59.48%, and calculated H=8.19%, found H=8.10% and 8.16%. It has $d^{23°}$=1.057, and $n_D^{12.4°}$=1.4475.

EXAMPLE IX

*Methyl 8-Acetoxy-6-Hydroxy-Octanoate*

There are introduced into a hydrogenation autoclave methyl 8-acetoxy-6-keto-octanoate (35 g.), anhydrous methanol (250 cc.), Raney nickel (3.5 g.), and triethylamine (1 cc.). The mixture is reduced at a temperature of 60–70° C. and under a hydrogen pressure of 100 kg./cm.$^2$.

When the hydrogen absorption is complete, the mixture is filtered to eliminate the catalyst. The methanol is driven off by distillation under reduced pressure (20 to 30 mm. Hg), while the last traces are removed under 3 mm. Hg, while the water bath is brought to 100° C.

The residue is distilled under 0.3 mm. Hg with a 12 cm. Vigreux column, and the following fractions are obtained: a first fraction (1 g.), B.P.$_{0.3\ mm.}$=90–139° C., and a second fraction (26 g.), B.P.$_{3.0\ mm.}$=139–140° C. The distillation tails amount to 1 g.

The second fraction, B.P.$_{0.3\ mm.}$=139–140° C., corresponds to the desired product. The yield is 74%.

The ester obtained is completely colourless and very syrupy. On analysis it gives: Calculated C=56.89%, found C=7.20%; calculated H=8.62%, found H=8.60%.

EXAMPLE X

Ethyl 8-Acetoxy-6-Hydroxy-Octanoate

The procedure of Example IX is followed, starting with ethyl 8-acetoxy-6-keto-octanoate (21 g.) dissolved in anhydrous ethanol (125 cc.), triethylamine (1 cc.) and Raney nickel (2.2 g.). The hydrogenation is carried out under a hydrogen pressure of 100 kg./cm.$^2$ for 1 hour at 65° C.

The catalyst is eliminated by filtration. The ethanol is driven off in vacuo and the product distilled under 0.3 mm. Hg, B.P.$_{0.3\ mm.}$=133–135° C. After a second distillation under 0.15 mm. Hg, the boiling point is 121–122° C. On analysis it gives: Calculated C=58.53%, found C=58.50%, and 58.52%; calculated H=8.94%, and found H=8.95% and 8.94%. It has $d^{23°}$=1.052, and $n_D^{19°}$=1.4479.

EXAMPLE XI

Ethyl 8-Formyloxy-6-Hydroxy-Octanoate

Ethyl 8-formyloxy-6-keto-octanoate (15 g.), dry methanol (250 cc.) and Raney nickel (2 g.) are introduced introduced into an autoclave under a pressure of 100 kg./cm.$^2$ of hydrogen, and maintained at a temperature of 60° C. for 1 hour.

After absortion of the hydrogen, the catalyst is eliminated by filtration and the methanol driven off under reduced pressure.

The residue is distilled under 0.4 mm. Hg, when there are obtained: a first fraction (3 g.), B.P.$_{0.4\ mm.}$=90–133° C., a second fraction (5 g.), B.P.$_{0.4\ mm.}$=133–140° C., and a third fraction (4 g.), B.P.$_{0.4\ mm.}$=140–145° C.

The third fraction (140–145° C.) is distilled a second time under 0.15 mm. Hg, to give a fraction (3 g., 20%), B.P.$_{=0.15\ mm.}$=133–134° C.

This fraction is the desired product. It is slightly contaminated by some unreduced ketone and by ethyl 6 - hydroxy - octanoate. It has $d^{24°}$=1.066 and $n_D^{12.4°}$=1.4541. On analysis it gives: Calculated C=56.89%, found C=57.86% and 57.96%; calculated H=8.62%, and found H=9.25% and 9.25%.

EXAMPLE XII

Into a 250 ml. spherical flask, provided with a small distillation column and a funnel, are introduced freshly distilled methyl 8-acetoxy-6-keto-octanoate (30 g.), isopropyl alcohol rectified over calcium filing (130 ml.), and freshly distilled aluminum isopropoxide (25 g.).

The mixture is heated on a water bath adjusted to about 95° C. in order to remove the acetone formed. The level is maintained constant by the simultaneous addition of isopropyl alcohol at a rate equal to the rate of distillation of the acetone.

The distillation of the acetone is continued until it is complete (by Legal's nitroprusside reaction). This takes about 12 hours.

The isopropyl alcohol is then driven off in vacuo, the residue is taken up in ether and the ethereal solution is poured on to ice to which a little hydrochloric acid has been added, in order to obtain a final pH of from 2 to 2.5. The aqueous layer is extracted with ether (2×30 ml.), and the ethereal solutions are combined, washed first with water and then with an aqueous sodium bicarbonate solution, and finally dried over sodium sulphate.

After removal of the ether, the product is distilled under reduced pressure. Isopropyl 8-acetoxy-6-hydroxy-octanoate is obtained as a viscous, colourless liquid, the boiling point of which is 130–131° C. under 0.1 mm. Hg.

This compound does not give any derivative with 2,4-dinitrophenylhydrazine. Its refractive index is $n_D^{10°}$=1.4571, and its density is $d_{26°}^{26°}$=1.029. Its analysis is as follows: Calculated for $C_{13}H_{24}O_5$ C=60.00%, found C=60.50%; calculated H=9.24%, found H=10.08%.

The product was found to be identical with that which can be prepared from isopropyl 8-keto-7-octenoate by acetylation followed by reduction.

EXAMPLE XIII

Into a 250 ml. spherical flask provided with a mechanical stirrer is introduced methyl 8-acetoxy-6-keto-octanoate (23 g.) diluted in anhydrous methanol (100 ml.). The mixture is slowly agitated and maintained at a temperature of about 30° C. Powdered potassium borohydride (5.4 g.) is added in small quantities. When all the borohydride has been introduced, the agitation is maintained for a further hour at room temperature.

The solvent is removed in vacuo, the solid residue is taken up in either (100 ml.) and water (20 ml.) is added to this solution. The aqueous layer is extracted with ether and the combined ethereal solutions are dried over magnesium sulphate. The solvent is removed by distillation and the product is distilled in vacuo. A colourless viscous liquid, having a boiling point of 126–128° C. under a pressure of 0.27–0.30 mm. Hg, is obtained in a yield of 29%.

This compound, which is crude methyl 8-acetoxy-6-hydroxy-octanoate, does not give any derivative with 2,4-dinitrophenylhydrazine. Its refractive index is $n_D^{10.6°}$=1.4573, and its density is $d_{26°}^{26°}$=1.069. Analysis of it gives: Calculated C=56.89%, found C=57.80%–57.50%; calculated H=8.62%, found H=9.02%–9.09%.

It is to be noted that the analyses do not correspond exactly to the theoretical figures. The product is slightly contaminated by methyl 6-hydroxy-octanoate, which forms in the course of the reduction with borohydride.

In the course of this reduction, the medium becomes alkaline and this produces a fission of the methyl 8-acetoxy-6-keto-octanoate molecule into methyl 6-keto-octenoate, which in turn undergoes reduction to give methyl 6-hydroxy-octanoate, which is the impurity in the product:

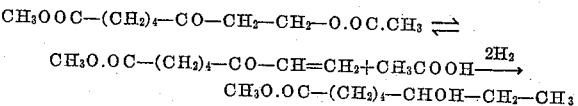

EXAMPLE XIV

6,8-Dithio-Octanoic Acid

Into a spherical flask provided with a reflux condenser are introduced methyl 8-acetoxy-6-hydroxy-octanoate (35 g.), finely powdered thiourea (34.4 g.), and freshly distilled 48% hydrobromic acid (55.5 g.). The mixture is refluxed for 24 hours in the absence of light.

To the resultant reaction mixture there is added an aqueous potassium hydroxide solution (220 cc. of water containing 67.5 g. of KOH, i.e. 8 molecules of KOH to 1 molecule of hydroxy-ester), and the mixture refluxed on an oil bath adjusted to 135–140° C. for two hours under a current of nitrogen.

After cooling at 0° C. the aqueous solution is extracted twice with 50 cc. of peroxide-free ether. The aqueous alkaline phase is acidified with 4 N hydrochloric acid until it produces a blue coloration with Congo red, with cooling in an ice bath.

At a pH in the neighbourhood of neutrality, the white milky precipitated product is extracted with chloroform (4×50 cc.). The organic layer is washed 4 times with

We claim:
1. A member of the group consisting of esters of the general formulae

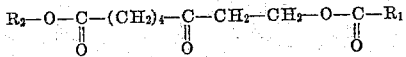

and

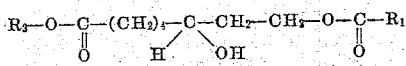

wherein $R_1$ represents a member of the class consisting of hydrogen, methyl and phenyl and $R_2$ represents an alkyl group having 1 to 3 carbon atoms.

2. Methyl 8-acetoxy-6-keto-octanoate.
3. Methyl 8-acetoxy-6-hydroxy-octanoate.
4. A process for the production of a lower alkyl 8-acyloxy-6-keto-octanoate, which comprises the step of maintaining a mixture of a substantially anhydrous carboxylic acid selected from the class consisting of formic acid, acetic acid and benzoic acid with a lower alkyl 6-keto-7-octenoate in a molar proportion of the range 3:1 to 13.3:1, at a temperature of the range 100–125° C. at atmospheric pressure for a period between 2 hours and 24 hours.
5. The process of claim 4, said step being carried out in the absence of light and oxygen.
6. A process for the production of an alkyl 8-acyloxy-6-keto-octanoate of the general formula

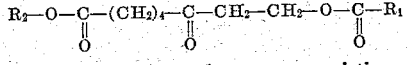

in which $R_1$ is selected from the group consisting of hydrogen, methyl and phenyl and $R_2$ is an alkyl group having one to three carbon atoms, which comprises the step of refluxing a mixture of a substantially anhydrous acid of the formula

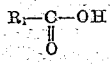

in which $R_1$ has the above significance, and a compound of the formula

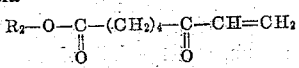

in which $R_2$ has the above significance, in a molar proportion of the range 12.3:1 to 13.3:1 for a period between 2 hours and 24 hours.
7. A process for the production of methyl 8-acetoxy-6-keto-octanoate, which comprises the step of refluxing a mixture of substantially anhydrous acetic acid and methyl 6-keto-7-octenoate in a molar proportion of the range 3:1 to 13.3:1 for a period between 2 hours and 24 hours.
8. A process for the production of a lower alkyl 8-acyloxy-6-hydroxy-octanoate, which comprises reducing a lower alkyl 8-acyloxy-6-keto-octanoate in which the acyloxy group is selected from the class consisting of formyloxy, acetoxy and benzoyloxy, by means of molecular hydrogen, at a pressure of at least 100 atmospheres and a temperature below 70° C. in the presence of Raney nickel catalyst.
9. A process wherein a lower alkyl 8-acyloxy-6-hydroxy-octanoate in which the acyloxy group is selected from the class consisting of formyloxy, acetoxy and benzoyloxy, is refluxed with excess thiourea and an aqueous solution of hydrobromic acid, then with an aqueous solution of excess potassium hydroxide.

References Cited in the file of this patent
UNITED STATES PATENTS

| | | |
|---|---|---|
| 2,752,373 | Acker | June 26, 1956 |
| 2,759,005 | Starker et al. | Aug. 14, 1956 |
| 2,759,953 | Knight et al. | Aug. 21, 1956 |
| 2,788,355 | Bullock | Apr. 9, 1957 |
| 2,792,406 | Acker | May 14, 1957 |
| 2,828,321 | Bullock | Mar. 25, 1958 |
| 2,872,455 | Bullock | Feb. 3, 1959 |

OTHER REFERENCES

Wagner-Zook, "Synthetic Organic Chemistry," John Wiley and Sons, Inc., New York (1953), pages 89 and 149–152.